United States Patent [19]
Furukawa et al.

[11] Patent Number: 6,167,095
[45] Date of Patent: Dec. 26, 2000

[54] METHOD AND APPARATUS FOR VARIABLY ALLOCATING UPSTREAM AND DOWNSTREAM COMMUNICATION SPECTRA

[75] Inventors: Neil E. Furukawa, Fremont; Sheldon N. Salinger, Los Altos, both of Calif.

[73] Assignee: General Dynamics Government Systems Corporation, Needham, Mass.

[21] Appl. No.: 08/998,237

[22] Filed: Dec. 24, 1997

Related U.S. Application Data

[63] Continuation-in-part of application No. 08/774,142, Dec. 24, 1996, Pat. No. 5,987,069.

[51] Int. Cl.⁷ .................................................. H04B 15/00
[52] U.S. Cl. ............................................ 375/285; 370/468
[58] Field of Search ................................... 375/240, 259, 375/260, 285, 224–227; 370/210, 468, 484, 485

[56] References Cited

U.S. PATENT DOCUMENTS

| | | | |
|---|---|---|---|
| 3,940,694 | 2/1976 | Price et al. ................................. | 325/42 |
| 4,291,277 | 9/1981 | Davis et al. ............................... | 330/149 |
| 4,462,001 | 7/1984 | Girard ....................................... | 330/149 |
| 4,555,790 | 11/1985 | Betts et al. . | |
| 4,587,498 | 5/1986 | Bonnerot et al. ......................... | 329/122 |
| 4,615,038 | 9/1986 | Lim et al. . | |
| 4,731,816 | 3/1988 | Hughes-Hartogs ....................... | 379/98 |
| 4,805,191 | 2/1989 | Burch et al. . | |
| 4,827,431 | 5/1989 | Goldshtein ............................... | 364/514 |
| 4,890,300 | 12/1989 | Andrews . | |
| 4,980,897 | 12/1990 | Decker et al. . | |
| 4,995,057 | 2/1991 | Chung . | |
| 5,105,445 | 4/1992 | Karam et al. . | |
| 5,107,520 | 4/1992 | Karam et al. . | |
| 5,113,414 | 5/1992 | Karam et al. . | |
| 5,148,448 | 9/1992 | Karam et al. . | |
| 5,249,200 | 9/1993 | Chen et al. . | |
| 5,285,474 | 2/1994 | Chow et al. . | |
| 5,295,138 | 3/1994 | Greenberg et al. ....................... | 370/57 |
| 5,313,467 | 5/1994 | Varghese et al. ......................... | 370/94.1 |
| 5,339,054 | 8/1994 | Taguchi .................................... | 332/100 |
| 5,394,392 | 2/1995 | Scott ......................................... | 370/24 |
| 5,479,447 | 12/1995 | Chow et al. ............................... | 375/260 |
| 5,497,505 | 3/1996 | Koohgoli et al. ......................... | 455/34.1 |
| 5,519,356 | 5/1996 | Greenberg ................................ | 329/340 |
| 5,548,809 | 8/1996 | Lemson .................................... | 455/34.1 |
| 5,572,553 | 11/1996 | Kimiavi et al. ........................... | 375/344 |

(List continued on next page.)

OTHER PUBLICATIONS

Suzuki, T., Takatori, H., Ogawa, M. and Tomooka, K., "Line Equalizer for a Digital Subscriber Loop Employing Switched Capacitor Technology," IEEE Trans. on Communications, vol. COM–30, No. 9, pp. 2074–82, Sep. 1982.

(List continued on next page.)

*Primary Examiner*—Don N. Vo
*Attorney, Agent, or Firm*—Jenner & Block

[57] ABSTRACT

An improved digital bi-directional communications transceiver in which the upstream and downstream portions of the frequency spectrum are allocated different bandwidths and positioned at different locations on the frequency spectrum in response to transmission line conditions and impairments such as system provisioning, background noise, radio frequency interference (RFI), crosstalk and reflected signals. The movement of the upstream and downstream carrier frequencies are elastic in that they may be adjusted in near real-time involving methods for determining the signal quality parameter(SQP) of the received signal. The SQP is used to estimate the bit error rate (BER) margin on the received data and also takes into account the total signal to interference ratio (SIR), where the interference includes crosstalk, RFI, and residual echo from the neighboring upstream or downstream channel. Because the carrier frequencies of the upstream and downstream channels are being dynamically allocated, it is necessary to implement a robust carrier acquisition, recovery and lock algorithm. The robust carrier algorithms allow carrier recovery of the transmitted upstream and downstream signals independent of the particular modulation or symbol rate.

35 Claims, 9 Drawing Sheets

U.S. PATENT DOCUMENTS

| | | | |
|---|---|---|---|
| 5,606,577 | 2/1997 | Grube et al. | 375/295 |
| 5,621,767 | 4/1997 | Brandt et al. | 375/344 |
| 5,625,651 | 4/1997 | Cioffi | 375/354 |
| 5,673,290 | 9/1997 | Cioffi | 375/260 |
| 5,694,440 | 12/1997 | Kallman et al. | 375/355 |
| 5,705,958 | 1/1998 | Janer | 332/103 |
| 5,710,766 | 1/1998 | Schwendeman | 370/329 |
| 5,726,978 | 3/1998 | Frodigh et al. | 370/252 |
| 5,732,333 | 3/1998 | Cox et al. | 455/126 |
| 5,751,766 | 5/1998 | Kletsky et al. | 375/224 |
| 5,754,961 | 5/1998 | Serizawa et al. | 455/517 |
| 5,805,586 | 9/1998 | Perreault et al. | 370/346 |
| 5,953,348 | 9/1999 | Barn | 370/480 |

OTHER PUBLICATIONS

Agazzi, O., Tzeng, C.–P.J., Messerchmitt, D.G., and Hodges, D.A., "Timing Recovery in Digital Subscriber Loops," IEEE Trans. on Communications, vol. COM–33, No. 6, pp. 558–569, Jun. 1985.

Gardner, F.M., "A BPSK/ZPSK Timing—Error Detector for Sampled Receivers," IEEE Trans. on Communications, vol. COM–34, No. 5, pp. 423–9, May 1986.

Meyers, M.H., "Robust Control of Decision Directed Loops," IEEE CH2655–9/89/0000–1030, pp. 1030–1036, Sep. 1989.

Sari, Hikmet, and Said, Moridi, "New Phase and Frequency Detectors for Carrier Recovery in PSK and QAM Systems", IEEE Trans. on Communications, vol. 36, No. 9, pp. 1035–1043, Sep. 1988.

Sari, H., Desperben, L., and Moridi, S., "A New Class of Frequency Detectors for Carrier Recovery in QAM Systems", IEEE CH2314–3/86/0000–0482, pp. 482–486, 1986.

Brown, R., Sorbaba, M., Wang, T., Segev, R., Van Kerkhove, J.F., Mildonian, H., Hall, C., Zimmerman, G., Martinez, K., Pires, T.K., Mullaney, K., Zain, I., Young, B., Gleichauf, P., Hohhof, K., "Draft Interface Specification for a CAP Based RADSL System", Jul. 22, 1996.

Karam, G., and Sari, H., "A Data Predistortion Technique with Memory for QAM Radio Systems", IEEE Trans. on Communications, vol. 39, No. 2, pp. 336–344, Feb. 1991.

METHOD AND APPARATUS FOR VARIABLY ALLOCATING UPSTREAM AND DOWNSTREAM COMMUNICATION SPECTRA

This appln is a C-I-P of Ser. No. 08/774,142 filed Dec. 24, 1996, now U.S. Pat. No. 5,987,069.

FIELD OF THE INVENTION

The present invention generally relates to the field of digital data communications. More specifically, the present invention is for an improved transmission system which optimizes the transmitted signal characteristics for a particular CAP/QAM based transmission medium. In particular, this invention relates to a method and apparatus for variably allocating the upstream and downstream communication spectra based on the channel impairments such as co-channel interference caused by crosstalk and radio frequency interference (RFI) in a bidirectional communication system.

BACKGROUND OF THE INVENTION

Analog telephone communication or POTS (plain old telephone service) typically requires a bandwidth of approximately 4 KHz. The existing twisted pair copper wire infrastructure now in place and initially designed for analog voice communication is now being viewed by telephone companies as a means of delivering high-speed digital information, usually over the "last mile" (i.e., the last segment of copper wire between a central office and a user location). To accommodate the high speed digital data over the same copper wire as the POTS service, a pair of modems are used, one at a central location (the central office or optical network unit (ONU)) and another at the user or residential premise, called a digital-subscriber-line (DSL) modem. In the case of DSL, the digital information is communicated over the same copper wire as the POTS service, but at higher frequencies, with the lower portion of the frequency spectrum being reserved for POTS service in the event of a failure of the high speed communication system. Passive filters are used to separate the POTS service and the high speed data which occupies the frequency spectrum from approximately 30 kHz up to 10 MHz. This feature is commonly referred to as "lifeline POTS service" and is generally advantageous to maintain as part of a communication system due to the time-tested reliability of POTS service.

While there are several versions of DSL, one type is an Asymmetric DSL (ADSL) communication system which is intended for consumer applications such as Video on Demand and Internet access. ADSL provides bidirectional data communication between the central office or "CO" and several end user or remote locations. In such an asymmetric system, the "downstream" data direction is defined as the transmission of data from the central office or ONU to the remote locations, while the "upstream" data direction is defined as the transmission of data from a remote location to the central office. Because the bandwidth capacity of the copper wire is somewhat limited, the ADSL asymmetric data communication system allocates more of the available frequency spectrum to the downstream direction. This allocation is based primarily on the fact that more data generally flows in the downstream direction than in the upstream direction. For example, one application of this type of system may be "video on demand" where an end user at a remote location requests the transmission of a particular video program. In this situation, the upstream data consists primarily of control and selection information, whereas the downstream data is significantly larger in that it consists of large amounts of data intensive video information. Thus, the upstream and downstream channels need not be equal for most, if not all, applications.

The transmit signal frequency spectrum allocation for a conventional CAP (Carrierless AM/PM) based Rate Adaptive DSL (RADSL) system utilizing the existing copper wire infrastructure, which has been proposed by AT&T Paradyne to the T1.E1.4 Committee, is shown in FIG. 1. As shown in FIG. 1, POTS communication occupies the lowest portion of the spectrum, typically 4 KHz. The next portion of the spectrum is allocated to the upstream channel. The spectral start frequency for the upstream channel is 35 kHz and the baud rate is fixed at 136 kbaud for modulations of 8, 16, 32, 64, 128 and 256 CAP. The next portion of the spectrum is allocated to the downstream channel. The spectral start frequency for the downstream channel is 240 kHz and the baud rate is selectable from 340, 680, 816, 952, and 1088 kbaud for modulations of 8, 16, 32, 64, 128 and 256 CAP. The upstream and downstream channels both use nominal square-root raised cosine shaping. The selection of baud rate and modulation format is determined during an initialization sequence where an exhaustive search is performed to locate the best configuration for the given loop and noise environment.

However, there are several drawbacks to the above mentioned implementation. First of all, it is only effective if the interference and noise environment remain fairly static, since the line conditioning is only performed during the initialization sequence. Second, a single large narrowband interference which is typical for RFI may result in a significant reduction in available modulation states required to maintain the necessary BER margin.

The present invention overcomes these drawbacks by employing a robust technique for line probing and characterization which allows a near-real time allocation of the upstream and downstream spectra, while at the same time optimizing the baud rate and modulation format.

SUMMARY OF THE INVENTION

The present invention provides an improved digital bidirectional communication transceiver system in which the upstream and downstream portions of the frequency spectrum are allocated based on the computed signal quality parameters representative of the line conditions. According to the present invention, either the upstream or downstream portion is located immediately adjacent the POTS channel and may be of a variable size. The other portion is then located at a higher frequency which may itself be fixed or may be variable in dependence on the variable sized portion located adjacent to the POTS channel. For example, the downstream channel may be positioned at a lower frequency immediately adjacent the POTS channel, and the upstream channel may be positioned at a frequency higher than the downstream channel. In this case, the upstream channel may be located at either a fixed frequency or may be positioned at a variable frequency depending on the bandwidth of the downstream channel. Alternatively, the upstream channel may be located adjacent the POTS channel, with the downstream channel located at a higher frequency. Similarly, the downstream channel may be located at either a fixed or variable frequency.

A signal quality parameter (SQP) is estimated at each receiver for either the upstream and downstream channels, respectively. The SQP is used to estimate the bit error rate (BER) or SNR margin on the received data. The SQP takes into account the total signal to interference (SIR) ratio, where the interference includes background noise, crosstalk, residual intersymbol interference, residual echo from the neighboring upstream or downstream channel, and distortion.

Additionally, the frequency spectrum allocated to both the upstream and downstream channels is elastic in that they may be adjusted in near real-time to match the particular bandwidth requirements of a given system at a given point in time. This is accomplished by a combination of adjusting the baud rate, modulation format and spectral shaping.

Because the carrier frequencies of the upstream and downstream channels are being dynamically allocated, it is necessary to implement a robust carrier acquisition, recovery and lock algorithm. The robust carrier algorithms allow carrier recovery of the transmitted upstream and downstream signals independent of the particular modulation format or baud rate.

The present invention will become more apparent from the following Brief Description of the Drawings and Description of Preferred Embodiments.

DESCRIPTION OF PREFERRED EMBODIMENTS

Figure 4:
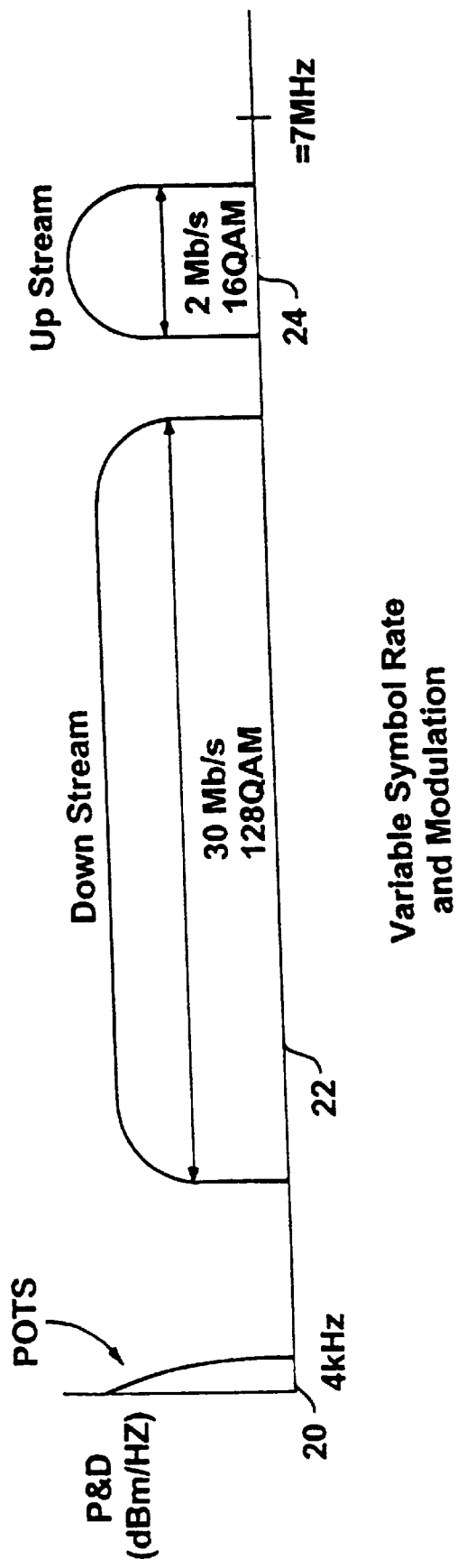
FIG. 4 is an illustration of a frequency spectrum according one embodiment of to the present invention showing an increase in the width of the downstream channel.

Referring to FIG. 4, therein is shown the frequency spectrum allocation according to one embodiment of the present invention. The embodiment of FIG. 4 has the downstream channel positioned adjacent the POTS channel, with the upstream channel located at a higher frequency than the downstream channel. Additionally, the upstream channel is located at the next available portion of the frequency spectrum up from the downstream channel, i.e., it is not located at a fixed frequency. As shown in FIG. 4, the POTS channel 20 is positioned at the lowest portion of the frequency spectrum. Next to POTS is positioned the downstream channel 22. Finally, the upstream channel 24 is positioned adjacent the downstream channel 22 at the next usable frequency portion.

Figure 1:
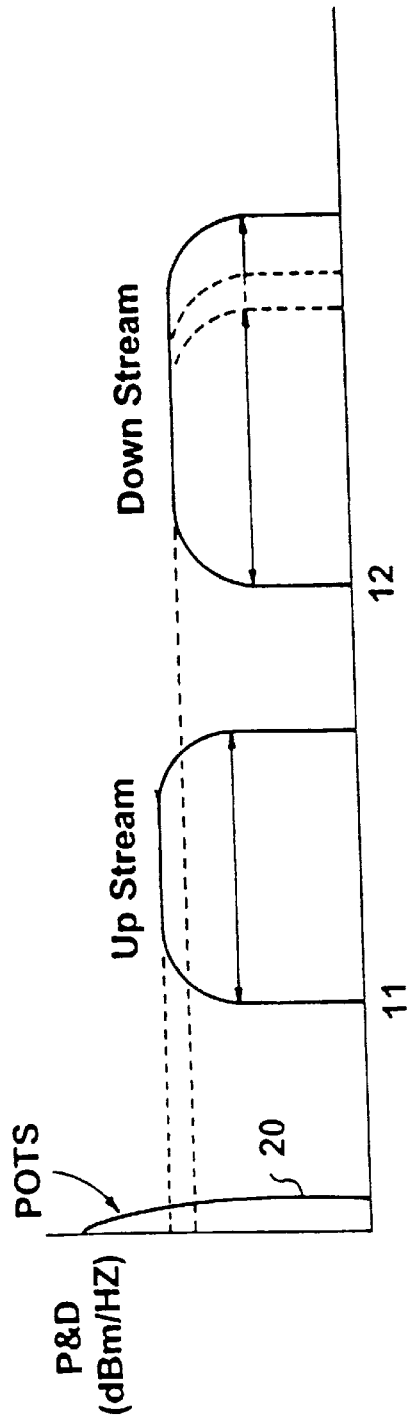
FIG. 1 is an illustration of a prior art frequency spectrum.
Figure 2:
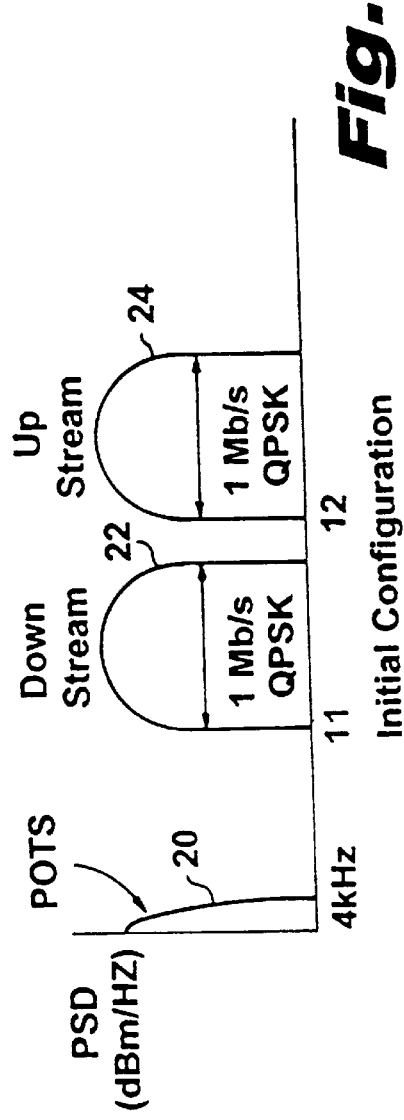
FIG. 2 is an illustration of an initial frequency spectrum according to one embodiment of the present invention.

Transceiver initialization is required in order to establish a bidirectional communication session between the local and remote transceivers. FIG. 2 shows the frequency spectrum of FIG. 4, upon initialization. It should be noted that initialization may occur at installation or at any time upon user request or based upon system conditions and requirements.

Figure 3A:
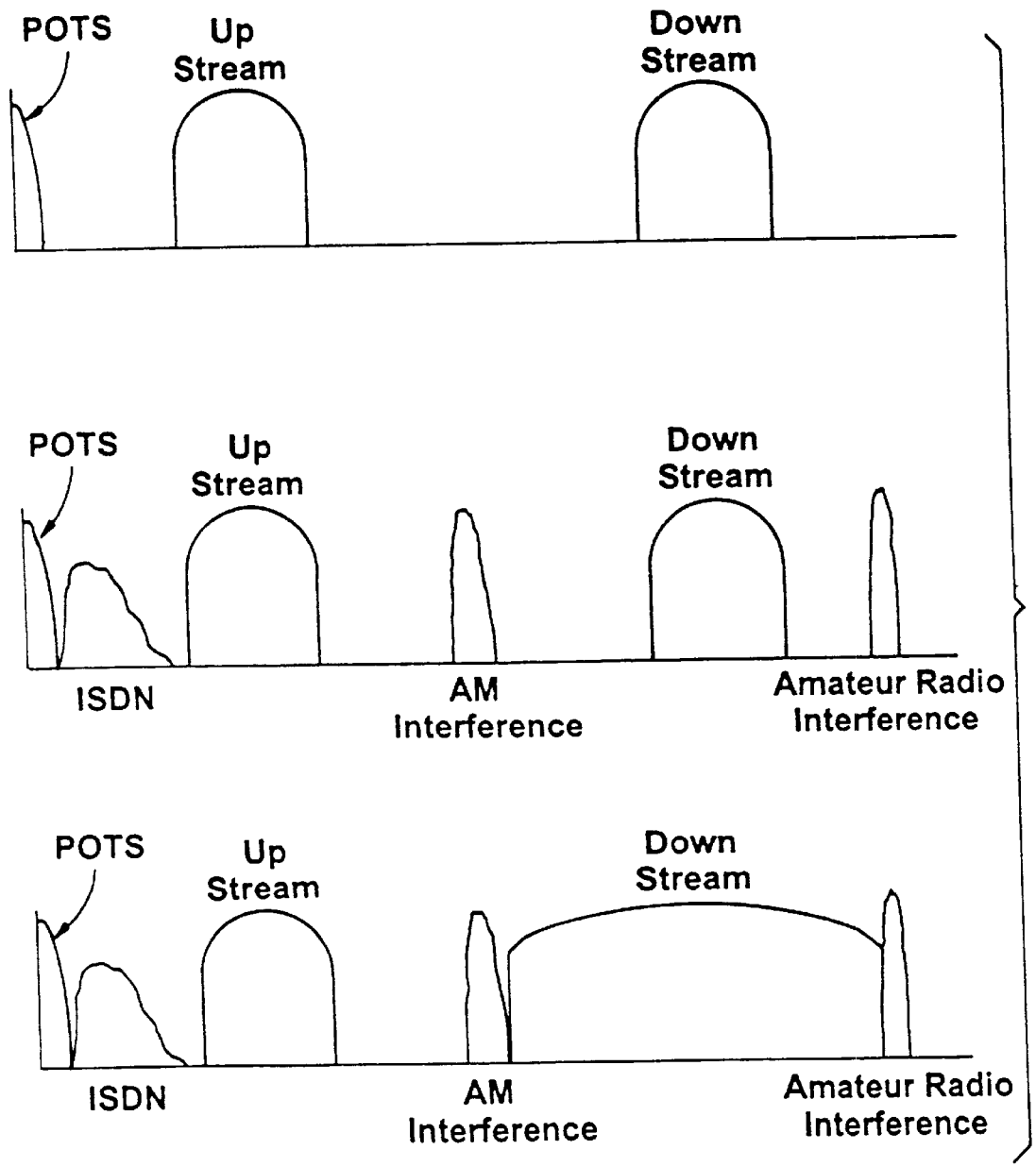
FIGS. 3a, 3b and 3c are illustrations of a frequency spectrum according to the present invention showing different embodiments for initialization and repositioning of the upstream and downstream channels.

According to a preferred embodiment of the present invention, the upstream and downstream channels are positioned at predetermined frequencies to allow initial communication between a VTU-ONU (VDSL Terminal Unit-Optical Node Unit, i.e., central site) and a VTU-R (remote site). This initialization procedure is shown in FIG. 3a. The initial communication from the central site causes the remote site to "wake up" (spectrum "1"; FIG. 3a). After waking up, the remote site characterizes the noise characteristics of the communication line, using, for example, wideband FFT analysis (spectrum "2"; FIG. 3a). The characterizing information for the line is then communicated from the remote site to the central site using the predetermined upstream channel. Upon receiving the characterizing information at the central site, the central site determines the upstream and downstream carrier frequencies, as well as the possible bandwidth for each, depending on the line noise characteristics (spectrum "3"; FIG. 3a). The data rate which is desired to be achieved given the possible bandwidth is then established by selecting the appropriate modulation format (e.g., 16-QAM, 64 QAM, . . . ) and baud rate. For example, as shown in FIG. 3a, (spectrum "3"), the upstream and downstream channels are positioned to avoid interference from other communication systems operating at different frequencies (e.g., ISDN, AM, . . . ). The initialization process may be repeated at a later time to take into account the effect of interference sources which may change over time.

Figure 3B:
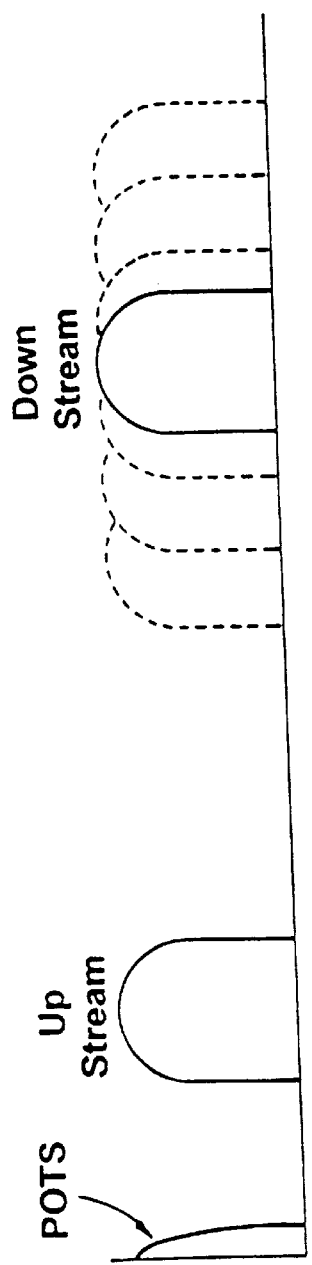

Alternatively, the initialization and line characterization may be performed by first setting the upstream and downstream channels to predetermined carrier frequencies and bandwidths. For example, the upstream channel may be positioned at a low frequency and the downstream channel positioned at a higher frequency. Subsequently, the bandwidth of the downstream channel is incrementally increased and the remote site performs a signal quality parameter (SQP) analysis to determine the bit error rate of the downstream channel. This is shown in FIG. 3b. SQP analysis is discussed in detail below. This process is repeated until the maximum bandwidth is determined, i.e., where the bit error rate (BER) increases beyond an acceptable level.

Figure 3C:
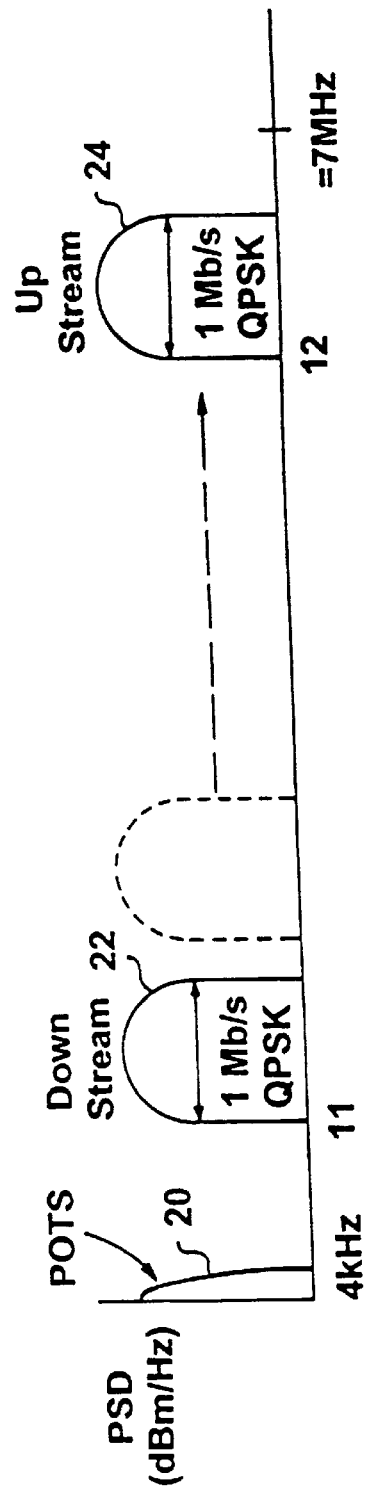

In yet another alternative embodiment, the initialization and line characterization may be performed as follows. Referring now to FIG. 3c, first, the downstream channel 22 is set to a predetermined minimum bandwidth, and the upstream channel 24 is positioned immediately adjacent the downstream channel 22, but higher in frequency. With the upstream and downstream channels 24 and 22 in the positions shown in FIG. 2, the portions of the frequency spectrum occupied by the upstream and downstream channels are analyzed using a signal quality parameter (SQP) analysis, which is described in detail below. Essentially, the SQP analysis determines the signal to noise ratio of signals being transmitted in a particular portion of the frequency spectrum and determines the interference environment associated with that portion of the spectrum.

Next, as shown in FIG. 3c, the upstream channel 24 is incrementally swept up in frequency and that portion of the frequency spectrum is analyzed using a combination of a complex FFT and the SQP analysis described herein. This process is repeated until the usable portion of the frequency spectrum has been adequately characterized and identified. The usable portion of the frequency spectrum is determined by identifying the highest portion of the frequency spectrum which still provides adequate signal transmission performance. It should be noted that as the upstream channel 24 is moved up in frequency to characterize the different portions of the frequency spectrum, the first portion which results in unacceptable signal to noise performance does not necessarily determine the upper limit of the usable portion of the frequency spectrum. Rather, this may just be due to spurious noise or other narrowband radio frequency interference phenomenon (RFI), and may, in fact, be followed by further usable portions of the spectrum. Thus, it is necessary to continue the characterization of the frequency spectrum beyond the first area of poor performance. Generally, the upper limit of the usable portion of the frequency spectrum is reached once consistently poor performance is observed for several contiguous regions.

In order to maximize the available bandwidth for the downstream channel 22, the upstream channel 24 may be positioned at the last usable upper portion of the spectrum (FIG. 4). This allows the downstream channel to be increased in size to accommodate the particular data transmission requirements of a given system configuration.

The initialization or characterization process according to the various embodiments of the present invention may be carried out repeatedly at certain intervals to characterize transmission media whose characteristics may change according to time, temperature, and other conditions.

Because the upstream and downstream channels 22 and 24, respectively, are moved around in frequency, it is necessary to quickly and accurately locate the carrier frequency in order to properly demodulate each of the upstream and downstream channels. This is accomplished using a carrier recovery algorithm discussed in detail below.

Positioning of Upstream and Downstream Channels

The positioning of the upstream and downstream channels in the frequency spectrum involves several determinations. First, it must be determined which of the upstream and downstream channels is positioned at the lower frequency and which is positioned at the higher frequency. Second, a determination must be made as to whether the channel positioned at the higher frequency is positioned at a fixed carrier or is dynamically adjusted to occupy the next available frequency spectrum beyond the lower frequency channel.

With respect to which of the upstream or downstream channels occupies the lower frequency, this determination is typically made based on the provisioning of communication services and the types of communication services being offered in a particular setting or environment. For example, in the case of video-on-demand or switched digital video, the upstream channel is used to convey control information, while the downstream channel is used to convey data. In such an environment, it is desired to have a lower bit error rate for the downstream channel which is typically more sensitive to data errors which result in visual artifacts. Therefore, the downstream channel is positioned at the lower frequency (which typically experiences less attenuation and other degradation and thus exhibits better signal to noise performance), while the upstream channel is positioned at the higher frequency.

Conversely, in the case of ADSL communication, system provisioning typically allows for the presence of other communication schemes (e.g., ISDN) within the same physical cable. This typically leads to noise and other interference at the lower frequencies. Therefore, in such a situation the upstream channel is placed at the lower frequency while the downstream channel is placed at the higher frequency in order to reduce the deleterious effects of the other communication schemes.

With respect to whether the higher frequency channel (which may be either the upstream or downstream channel) is positioned at a fixed carrier frequency or is dynamically positioned at a frequency just above the lower frequency, this determination is again made based on system provisioning and the types of communication schemes present in the cable.

Where several types of communication schemes are present in a cable, the different upstream channels for each of the different schemes are constrained to be within a particular frequency range. Similarly, the different downstream channels are constrained to be within a particular frequency range, which is different from that assigned to the upstream channels. This type of channel assignment minimizes the effects of near end crosstalk between different conductors within the same cable. The term "near end" crosstalk is used to refer to signal interference whose effects are felt at the near end. For example, the crosstalk from a downstream channel in wire group "A" to an upstream channel in wire group "B" will be felt at the near end, i.e., the central site receiving upstream channel "B". Similarly, the crosstalk from upstream channel "A" to downstream channel "B" will be felt at the remote site receiving downstream channel "B". As will be evident to those of ordinary skill in the art, "far end" crosstalk involves signal interference from one downstream channel to another or one upstream channel to another.

Using the signal assignment scheme discussed above, near end crosstalk is essentially eliminated since the upstream and downstream channels are at different frequencies. Therefore, even if there is any crosstalk, it will have virtually no impact. Such a signal assignment scheme is used when crosstalk is a concern, i.e., where there are different wire groups within the same physical cable which carry signals of the same communication scheme. e.g., several ADSL communication lines. In such an environment, the higher frequency (upstream or downstream channel) is constrained to a fixed frequency range and does not dynamically follow the bandwidth of the lower frequency (downstream or upstream channel). This prevents the downstream (or upstream) channel of one wire group from overlapping or coinciding with the upstream (or downstream) channel of another group.

Conversely, if system provisioning allows for only one wire group in a cable bundle to be using particular upstream and downstream frequencies, then the higher frequency channel (upstream or downstream) can immediately follow the lower frequency channel (downstream or upstream) since there is no concern as to overlapping the opposite frequency channels of another wire group.

Signal Quality Parameter (SQP)

Figure 5:
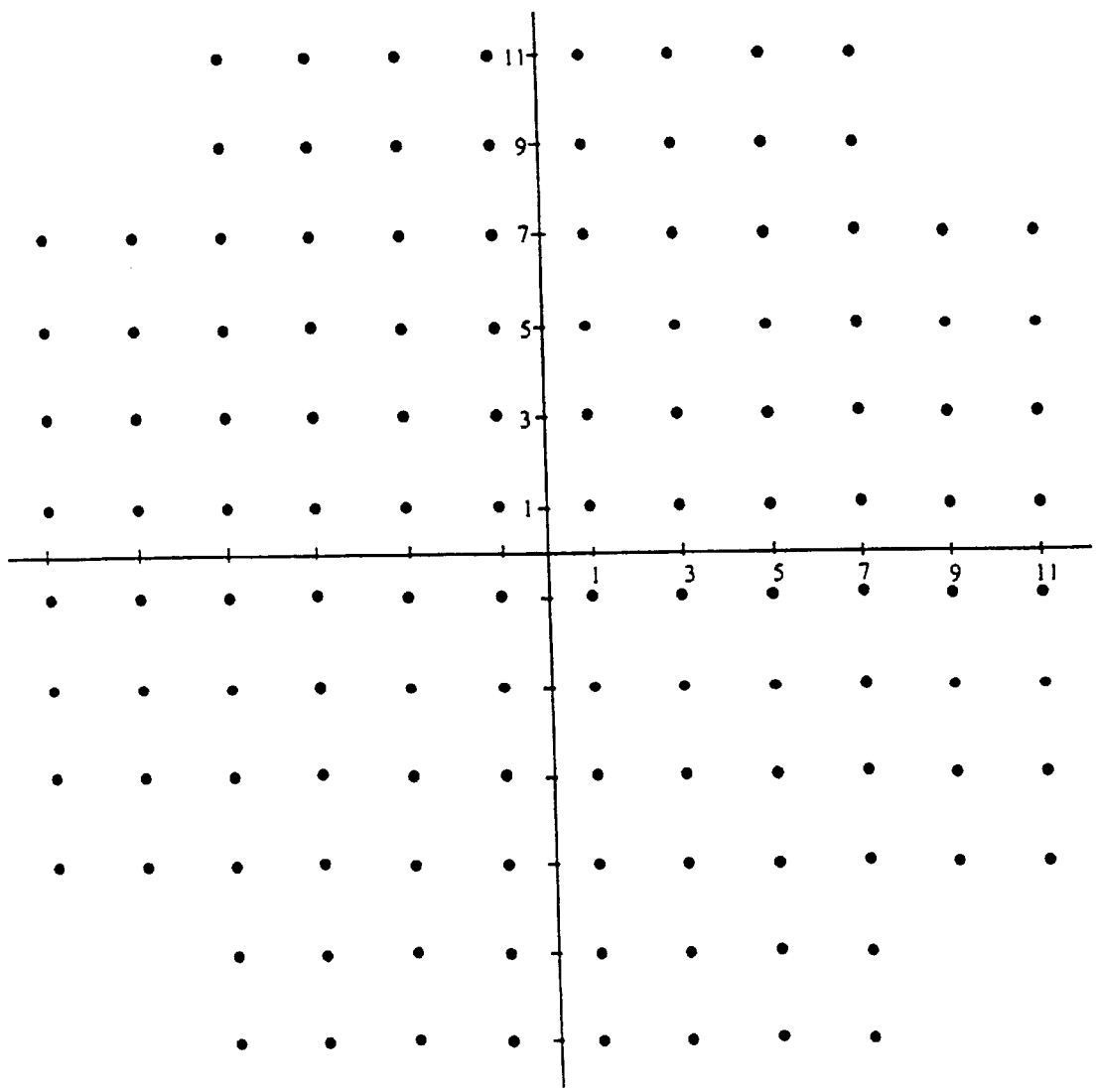
FIG. 5 is an illustration of a 128 QAM signal constellation.

The SQP analysis determines the signal to noise (or carrier to noise) ratio of a received signal from a calculation of the cluster variance of the signal constellation, and uses the cluster variance to determine the validity or accuracy of the calculated signal to noise ratio. FIG. 5 illustrates a typical signal constellation for a 128 QAM signal. Each point represents a particular phase and amplitude state. In the case of 128 QAM, each point represents seven bits of data. Cluster variance is a statistical measure over an entire constellation of the spread of the symbol clusters in the constellation about their ideal location points. It should be noted that the "cluster variance" is actually a standard deviation quantity rather than a conventional "variance" quantity. Cluster variance is calculated for either or both of the x (in-phase or horizontal axis, FIG. 5) and y (quadrature or vertical axis, FIG. 5) coordinates of a sample set of received symbols. Cluster variance also gives the relation between the signal to noise ratio and the noise margin, which is the minimum distance from any ideal constellation point to the decision boundary for the region in which that point would be selected as the symbol that was most likely transmitted. The relation is also a function of the size (number of ideal symbol locations) in the constellation.

The signal to noise ratio is calculated for constellations of different sizes, which may also include linear distortions such as offsets (biases), gain mismatch, lock angle error and quad angle error.

For a valid determination of carrier-to-noise ratio from a cluster variance analysis, it is necessary to be able to resolve the individual clusters and to be able to determine the cluster variance with reasonable accuracy. The carrier-to-noise ratio determined from the cluster variance is compared to predetermined carrier-to-noise ratio limits for particular modulation types to determine the reliability of the calculated carrier-to-noise ratio.

In a digital demodulator, decision boundaries are established specifically for the modulation type being received. These decision boundaries are based on an assumed ideal constellation, i.e., a constellation without any distortion. Based on a comparison of a received signal sample with the established decision boundaries, each sample is assigned to a bin corresponding to the decision state or symbol cluster in which it falls.

In an X-Y coordinate system, x represents the horizontal coordinate and y represents the vertical coordinate. In the absence of constellation skew and rotation, the in-phase (I) phase coordinate corresponds to the x coordinate and the quadrature (Q) phase coordinate corresponds to the y coordinate. In the presence of skew or rotation, these coordinates will deviate from the ideal condition. For each cluster, the following values are accumulated:

(1) Number of samples in cluster (i,j): $K_{ij}$ (2-1a)

(2) Sum of the x values in cluster (i,j): $\sum_{k=1}^{K_{ij}} x_{ijk}$ (2-1b)

(3) Sum of the y values in cluster (i,j): $\sum_{k=1}^{K_{ij}} y_{ijk}$ (2-1c)

(4) Sum of the squares of the x values in cluster (i,j): $\sum_{k=1}^{K_{ij}} x_{ijk}^2$ (2-1d)

(5) Sum of the squares of the y values in cluster (i,j): $\sum_{k=1}^{K_{ij}} y_{ijk}^2$ (2-1e)

(6) Sum of the products of the x and y values in cluster (i,j): $\sum_{k=1}^{K_{ij}} x_{ijk} y_{ijk}$ (2-1f)

In collecting vector (amplitude-phase) data for the individual samples of each cluster, an adequate number of samples must be obtained to insure a high level of statistical significance in the subsequent analysis of the data. It is generally recommended that at least an average of 100 samples per constellation cluster (or state) be collected. Thus, for an R-state constellation, at least 100R samples need to be collected.

Using the above defined terms, the following statistics are calculated for each cluster:

(1) Sample mean x-position of cluster (i,j):

$$\bar{x}_{ij} = \frac{1}{K_{ij}} \sum_{k=1}^{K_{ij}} x_{ijk}, \qquad (2\text{-}2)$$

(2) Sample mean y-position of cluster (i,j):

$$\bar{y}_{ij} = \frac{1}{K_{ij}} \sum_{k=1}^{K_{ij}} y_{ijk}, \qquad (2\text{-}3)$$

(3) Sample variance in x on cluster (i,j):

$$s_{xx_{ij}}^2 = \frac{1}{K_{ij}-1} \sum_{k=1}^{K_{ij}} (x_{ijk} - \bar{x}_{ij})^2 \qquad (2\text{-}4)$$
$$= \frac{1}{K_{ij}-1} \left[ \sum_{k=1}^{K_{ij}} x_{ijk}^2 - K_{ij}\bar{x}_{ij}^2 \right],$$

(4) Sample variance in y on cluster (i,j):

$$s_{yy_{ij}}^2 = \frac{1}{K_{ij}-1} \sum_{k=1}^{K_{ij}} (y_{ijk} - \bar{y}_{ij})^2 \qquad (2\text{-}5)$$
$$= \frac{1}{K_{ij}-1} \left[ \sum_{k=1}^{K_{ij}} y_{ijk}^2 - K_{ij}\bar{y}_{ij}^2 \right],$$

(5) Sample covariance of x and y for cluster (i,j):

$$s_{xy_{ij}}^2 = \frac{1}{K_{ij}-1} \sum_{k=1}^{K_{ij}} (x_{ijk} - \bar{x}_{ij})(y_{ijk} - \bar{y}_{ij}) \qquad (2\text{-}6)$$
$$= \frac{1}{K_{ij}-1} \left[ \sum_{k=1}^{K_{ij}} x_{ijk} y_{ijk} - K_{ij}\bar{x}_{ij}\bar{y}_{ij} \right],$$

(6) Root mean square (RMS) size of cluster (i,j):

$$s_{ij} = \sqrt{\frac{s_{xx_{ij}}^2 + s_{yy_{ij}}^2}{2}}. \qquad (2\text{-}7)$$

Equations 2-4 through 2-6 use the unbiased estimators of the population variances. Additionally, letting $\tilde{x}_{ij}$ and $\tilde{y}_{i,j}$ denote the "ideal" coordinates of the (i,j)-th constellation point, the x and y bias of cluster (ij), i.e., the shift of the cluster from its ideal location, can be expressed as:

$$b_{xij} = \bar{x}_{ij} - \tilde{x}_{ij}, \qquad (2\text{-}8a)$$

and $$b_{yij} = \bar{y}_{ij} - \tilde{y}_{ij}. \qquad (2\text{-}8b)$$

The total number of samples over all clusters can thus be expressed as:

$$N = \sum_{i=1}^{M} \sum_{j=1}^{M} K_{ij}, \qquad (2\text{-}9)$$

where M is the number of modulation levels in each coordinate. Thus, a quadrature amplitude modulated (QAM) constellation has $R=M^2$ clusters or states in the case of square constellations.

The sample variance of the cluster size in each coordinate, over all clusters is by the following expression:

$$s_x^2 = \frac{1}{N-M^2} \sum_{i=1}^{M} \sum_{j=1}^{M} \left[ \sum_{k=1}^{K_{ij}} x_{ijk}^2 - \frac{1}{K_{ij}} \left( \sum_{k=1}^{K_{ij}} x_{ijk} \right)^2 \right], \qquad (2\text{-}10a)$$

$$s_y^2 = \frac{1}{N-M^2} \sum_{i=1}^{M} \sum_{j=1}^{M} \left[ \sum_{k=1}^{K_{ij}} y_{ijk}^2 - \frac{1}{K_{ij}} \left( \sum_{k=1}^{K_{ij}} y_{ijk} \right)^2 \right]. \qquad (2\text{-}10b)$$

Using Equations 2-4 and 2-5 in 2-10a and 2-10b yields the x and y standard deviations on cluster size for the entire constellation. This is expressed as:

$$s_x = \sqrt{\frac{1}{N-M^2} \sum_{i=1}^{M} \sum_{j=1}^{M} (K_{ij}-1) s_{xx_{ij}}^2}, \qquad (2\text{-}11a)$$

$$s_y = \sqrt{\frac{1}{N-M^2} \sum_{i=1}^{M} \sum_{j=1}^{M} (K_{ij}-1) s_{yy_{ij}}^2}. \qquad (2\text{-}11b)$$

The weighting $(K_{ij}-1)/(N-M^2)$ on each cluster variance is needed to provide unbiased estimates, accounting for the number of samples in each cluster. $N-M^2$ is the number of degrees of freedom in the estimator. Finally, the RMS cluster size for the entire constellation is given by the following expression:

$$s = \sqrt{\frac{s_x^2 + s_y^2}{2}} \qquad (2\text{-}12)$$

$$= \sqrt{\frac{1}{2N-M^2} \sum_{i=1}^{M} \sum_{j=1}^{M} (K_{ij}-1) \left( s_{xx_{ij}}^2 + s_{yy_{ij}}^2 \right)},$$

where $s_{xx_{ij}}$ and $s_{yy_{ij}}$ are given by Equations (2-4) and (2-5). The RMS cluster size, or "cluster variance", is given by the following equation as $$s = \sqrt{\frac{1}{2N-M^2} \sum_{i=1}^{M} \sum_{j=1}^{M} (K_{ij}-1) \left( s_{xx_{ij}}^2 + s_{yy_{ij}}^2 \right)}, \qquad (2\text{-}13)$$

where, N, the total number of samples over all clusters, is given by the following equation:

$$N = \sum_{i=1}^{M} \sum_{j=1}^{M} K_{ij}. \qquad (2\text{-}14)$$

In Equations 2-13 and 2-14, M is the number of modulation levels in each coordinate of a QAM or QPR system (hence, a QAM constellation has $M^2$ clusters or states). $K_{ij}$ is the number of samples in cluster (ij). Also, $s_{xx_{ij}}^2$ and $s_{yy_{ij}}^2$ are the sample variances in x and y, respectively, on cluster (ij), and are given by the following equations as:

$$s_{xx_{ij}}^2 = \frac{1}{K_{ij}-1} \left[ \sum_{k=1}^{K_{ij}} x_{ijk}^2 - K_{ij} \bar{x}_{ij}^2 \right], \qquad (2\text{-}15)$$

$$s_{yy_{ij}}^2 = \frac{1}{K_{ij}-1} \left[ \sum_{k=1}^{K_{ij}} y_{ijk}^2 - K_{ij} \bar{y}_{ij}^2 \right]. \qquad (2\text{-}16)$$

For an ideal (undistorted) constellation, the carrier-to-noise ratio (CNR) is related to the cluster variance as follows:

$$C/N = (A_{RMS}^2/2)/s^2 = Ld^2/2s^2, \qquad (2\text{-}17)$$

where L is the mean square distance of the cluster centers from the origin of the constellation, which is dependent on the modulation type and can be shown to take on the following values:

| Values of L | |
| --- | --- |
| Modulation | L |
| QPSK | 2 |
| 16-QAM | 10 |
| 64-QAM | 42 |
| 256-QAM | 170 |
| 9-QPR | 5.3333 |
| 25-QPR | 16 |
| 49-QPR | 32 |
| 81-QPR | 53.3333 |

In Equation 2-17, d is the noise margin, i.e., the minimum (perpendicular) distance to the decision boundary. For a square decision region, this is any boundary. For an ideal, undistorted constellation, $d=\frac{1}{2}$, so that $$C/N \approx L/8s^2. \qquad (2\text{-}18)$$

When linear distortions to the constellation are present, including offsets, gain mismatch, lock angle error, and quad angle error, the RMS signal amplitude is given by $$\mathcal{A}_{RMS} = \sqrt{L} \, d_{RMS} \sqrt{1 + \frac{1}{L}\left(\frac{A_{RMS}}{d_{RMS}}\right)^2} \qquad (2\text{-}18a)$$

$$= \sqrt{L} \, \frac{B_{RMS}}{2} \sqrt{1 + \frac{4}{L}\left(\frac{A_{RMS}}{B_{RMS}}\right)^2}$$

so that Equation (2-17) becomes $$\frac{C}{N} = \frac{L B_{RMS}^2}{8s^2} \left[ 1 + \frac{4}{L}\left(\frac{A_{RMS}}{B_{RMS}}\right)^2 \right], \qquad (2\text{-}19)$$

where $$A_{RMS} = \sqrt{\frac{A_x^2 + A_y^2}{2}}, \qquad (2\text{-}20)$$

$$B_{RMS} = \sqrt{\frac{B_{xx}^2 + B_{yy}^2}{2}}. \qquad (2\text{-}21)$$

Here, $A_x$ and $A_y$ are the constellation offsets in the x and y directions, while $B_{xx}=2d_x$, and $B_{yy}=2d_y$ are the linear gains, i.e., column and row spacings. The general form of Equation 2-18a is actually obtained by generalizing from the specific example of a 16-QAM constellation. In the case of a 16-QAM constellation, the expression for $A_{RMS}$ is as follows:

$$\mathcal{A}_{RMS} = \sqrt{\frac{\begin{array}{l}2(d_x + A_x)^2 + d_y^2 + 2(d_x - A_x)^2 + d_y^2 + \\ 2(3d_x + A_x)^2 + 3d_y^2 + 2(3d_x - A_x)^2 + 3d_y^2 + \\ 2(3d_x + A_x)^2 + d_y^2 + 2(3d_x - A_x)^2 + d_y^2 + \\ 2(d_x + A_x)^2 + 3d_y^2 + 2(d_x - A_x)^2 + 3d_y^2\end{array}}{16}} \quad (2\text{-}21a)$$

$$= \sqrt{10\left(\frac{d_x^2 + d_y^2}{2}\right) + A_x^2}$$

$$= \sqrt{10\, d_{RMS}^2 + A_x^2}$$

$$= \sqrt{10}\, d_{RMS} \sqrt{1 + \frac{1}{10}\left(\frac{A_x}{d_{RMS}}\right)^2}.$$

It has been observed that Equation 2-21a may be generalized by replacing the quantity "10", which happens to be the particular L value for 16-QAM modulation, with the more general term L so that this equation may be used for other modulation types. This generalization leads to Equation 2-18a above.

In the most general case, with arbitrary linear or nonlinear distortions of the constellation, the carrier-to-noise ratio is related to the cluster variance as follows:

$$\frac{C}{N} = \frac{\mathcal{A}_{RMS}^2}{2s^2}, \quad (2\text{-}22)$$

where $$\frac{\mathcal{A}_{RMS}^2}{2} = \frac{1}{M^2} \sum_{i=1}^{M} \sum_{j=1}^{M} \left(\hat{x}_{i,j}^2 + \hat{y}_{i,j}^2\right) \quad (2\text{-}23)$$

is the mean square signal power of the entire constellation, expressed in terms of the estimated cluster centers (Equations 2-2 and 2-3) and the variance $s^2$ is the noise power of the entire constellation.

It is well known that the bit-energy to noise-density ratio, $E_b/N_o$, is related to the carrier-to-noise ratio, CNR, by:

$$\frac{E_b}{N_o} = \frac{C}{N} \times \frac{B_N}{R_b}, \quad (2\text{-}24)$$

where $B_N$ is the noise bandwidth (normally the IF bandwidth), and $R_B$ is the bit rate.

For a baseband bandwidth of W, the Nyquist rate, or maximum bit rate for transmission without intersymbol interference, for a rectangular pulse amplitude modulated (PAM) signal is $$R_B = 2W \log_2 M, \quad (2\text{-}25)$$

where there are m=$\log_2 M$ transmitted bits per symbol. The IF bandwidth corresponding to W is $B_N$=2W. Therefore, for a rectangular PAM signal, the following relationship is obtained:

$$\frac{R_B}{B_N} = \log_2 M \text{ bps/Hz.} \quad (2\text{-}26)$$

For quadrature-type transmission utilizing M levels in each coordinate, there are $$m = \log_2 M^2 = 2\log_2 M \quad (2\text{-}27)$$

bits per symbol, so that $$\frac{R_B}{B_N} = 2\log_2 M. \quad (2\text{-}28)$$

With Nyquist pulse shaping having a roll-off factor $\beta$, the baseband bandwidth for a quadrature modulated signal is $$W = f_N(1+\beta) = \left[\frac{R_B}{2\log_2 M^2}\right](1+\beta), \quad (2\text{-}29)$$

where $f_N = R_B/(2\log_2 M^2)$ is the Nyquist frequency, i.e., maximum symbol rate without intersymbol interference, and is essentially the Nyquist bit rate divided by the number of bits per symbol. Therefore, $$\frac{R_B}{2W} = \frac{R_B}{B_N} = \frac{\log_2 M^2}{1+\beta} = \frac{2\log_2 M}{1+\beta} \text{ bps/Hz, or} \quad (2\text{-}30)$$

$$\frac{B_N}{R_B} = \frac{1+\beta}{2\log_2 M}. \quad (2\text{-}31)$$

Consequently, the bit-energy to noise-density ratio for a QAM or QPR signal with M levels in each coordinate and arbitrary Nyquist pulse shaping is $$\frac{E_b}{N_o} = \frac{C}{N}\left(\frac{1+\beta}{2\log_2 M}\right). \quad (2\text{-}32)$$

Having determined the carrier-to-noise ratio from the cluster variance, this expression may then be used to determine the bit-energy to noise-density ratio.

For the cluster variance analysis to validly determine carrier-to-noise ratio, it is necessary first to be able to separate and resolve the individual clusters. It is not possible to resolve the individual clusters when the RMS cluster size s is greater than or equal to the noise margin d, i.e., s≥d, or in the more general case with constellation distortions, when s≥$d_{rms}$. In practice, it is probably not possible to resolve the individual clusters when s≥kd, where k is some number in the range 0.5<k<1.0.

When s=kd, we have that $$C/N \approx L d^2/2(kd)^2 = L/2k^2, \quad (2\text{-}33)$$

which in decibels may be expressed as:

$$(C/N)_{dB} = 10\log_{10} L/2k^2. \quad (2\text{-}34)$$

The expression in Equation 2-34 is then used to analyze particular portions of the frequency spectrum, i.e., to determine the interference and noise environment associated with each particular portion of the spectrum.

Limiting CNRs, resulting in acceptable bit error rates (BER), may be calculated as a function of k and the parameter L for each modulation type, as listed in the table below. It should be noted that as the assumed limiting value of k decreases, the maximum size of the cluster beyond which it is not possible to meaningfully determine a cluster variance decreases, and therefore the minimum CNR beyond which it is not possible to meaningfully determine a cluster variance increases. If the RMS cluster size is smaller than kd, then the CNR will be above the required minimum value. Thus, the larger k is, the better, since lower quality signals (lower CNR) can then be accurately and reliably processed. It should further be noted that k is not a number which is selected, but it is rather determined experimentally, or may be estimated using advanced statistical techniques.

TABLE 1

Limiting Carrier-to-Noise Ratios Below which the Cluster Variance Analysis is Invalid

| Modulation | L | CNR (dB) | | | |
|---|---|---|---|---|---|
| | | k = 0.25 | k = 0.5 | k = 0.75 | k = 1.0 |
| QPSK | 2 | 12.0 | 6.0 | 2.5 | 0.0 |
| 16-QAM | 10 | 19.0 | 13.0 | 9.5 | 7.0 |
| 64-QAM | 42 | 25.2 | 19.2 | 15.7 | 13.2 |
| 256-QAM | 170 | 31.3 | 25.3 | 21.8 | 19.3 |
| 9-QPR | 5.3333 | 16.3 | 10.7 | 6.8 | 4.3 |
| 25-QPR | 16 | 21.0 | 15.0 | 11.5 | 9.0 |
| 49-QPR | 32 | 24.0 | 18.0 | 14.5 | 12.0 |
| 81-QPR | 53.3333 | 26.3 | 20.3 | 16.8 | 14.3 |

In the case of a normal distribution of samples in each coordinate of a square cluster, when s=d (k=1.0), it can therefore be calculated that 31.7% of the samples will fall outside the cluster decision region, and 31.7% of the samples from adjacent clusters will fall inside the decision region of concern. This in turn will cause a large error, on the order of 63% (the sum of the two 31.7% errors), in the estimated value of s, an error of the order of 127% in the cluster variance, and a corresponding error on the order of 3.5 dB in the calculated CNR. Similarly, when k=0.75, the error in the cluster variance will be on the order of 27%, and the error in the CNR will be on the order of 1.0 dB. When k=0.5, the error in the cluster variance will be on the order of 9%, and the error in the CNR will be on the order of 0.4 dB.

Thus, while it is possible to calculate a cluster variance for any $k \leq 1$, it is recommended that $k \leq 0.5$ ($s \leq 0.5d$) to avoid excessive errors in calculating the CNR. Also, from Table 1, it is apparent that as k decreases (tighter clusters), the calculation of cluster variance and the subsequent estimation of CNR is considered to be valid only for higher CNRs. As expected, the higher-order constellations require higher CNRs to permit calculating a valid cluster variance.

Carrier Recovery Algorithm

Carrier recovery is used to locate the carrier frequency for either the upstream or downstream channel 24 and 22, respectively. As each of these channels moves around in frequency, it is necessary to quickly and accurately locate the carrier channel in order to properly demodulate the upstream and downstream channels.

Figure 6:
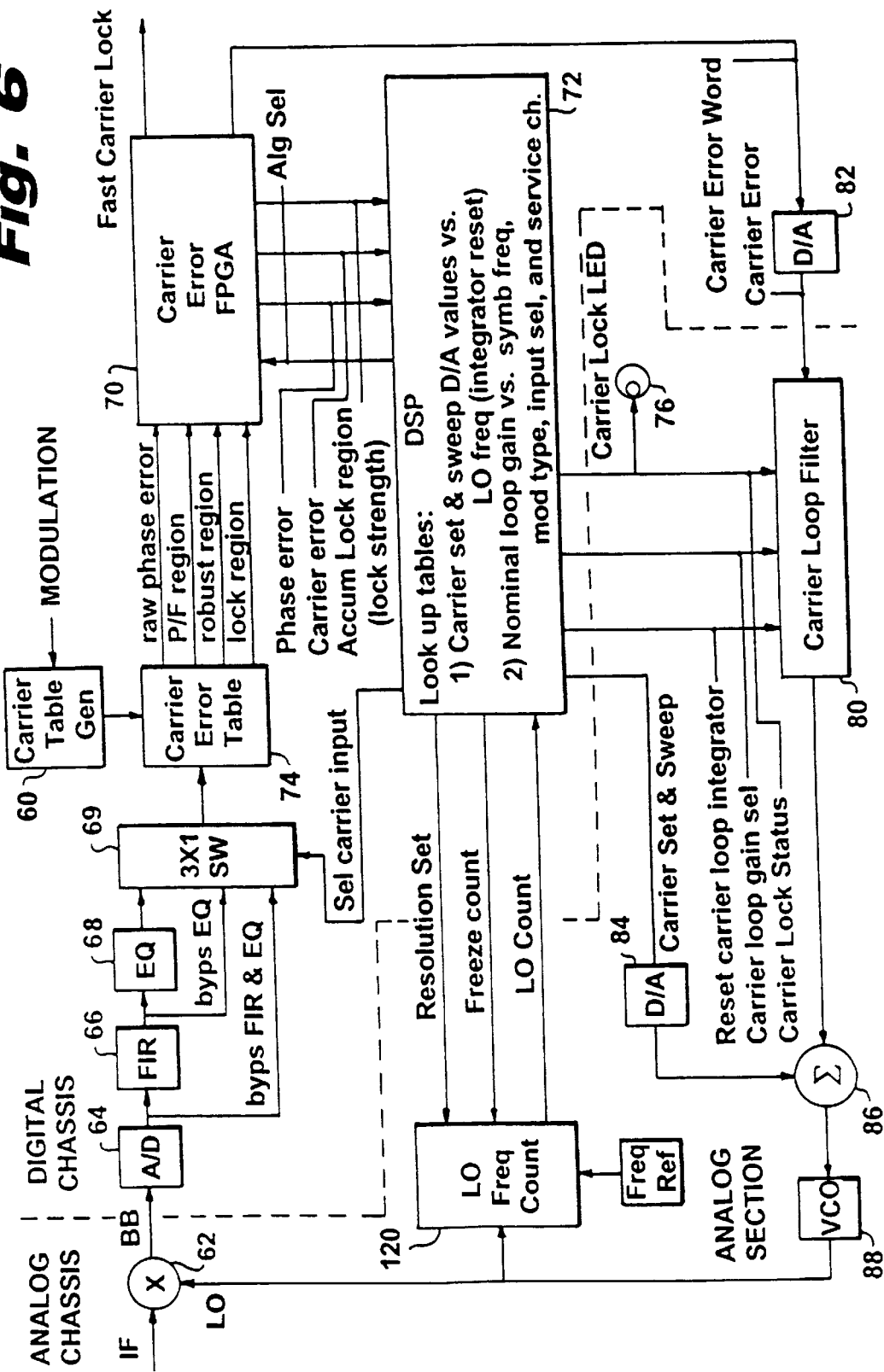
FIG. 6 is a block diagram of the carrier recovery loop circuit.

The essential elements in the carrier recovery circuit are shown in FIG. 6. The individual elements of the carrier recovery circuit will first be described. Subsequently, the interaction and operation of the individual elements will be described.

Referring now to FIG. 6, carrier table generator 60 receives as input the type of modulation scheme being used and in turn generates the error regions for that modulation scheme. These error regions may be, for example, the robust region distance, lock region distance, or the P/F region distance. The carrier table generator also generates the distance to decision threshold for the particular modulation scheme. The output of the carrier table generator 60 is stored in carrier error table 74 which is essentially a look-up table.

The IF to Base Band (BB) converter 62, analog to digital converter 64, FIR filter 66, and equalizer 68 operate on both the Inphase and Quadrature (I/Q) signals. For simplification purposes, only one set of these elements is shown, e.g., the I signal. These elements are duplicated for processing the Q signal. In order to increase loop bandwidth (decrease the delay time of the loop shown in FIG. 6, for example, to accommodate signals that have an analog service channel, the pipeline delay through the FIR 66 and/or the equalizer 68 may be bypassed, under the control of a bypass selector switch 69. Bypass selection is controlled by DSP 72. After selection by the DSP, the digitized analog signal is used as the input signal to carrier error look up table 74. The carrier error look up table 74 receives inputs from both the I and the Q signals and performs a two dimensional lookup to determine the phase error.

The phase error output of the carrier error look up table 74 is an 8 bit word in offset binary format. This phase error word is the phase error between the received signal and the ideal constellation point if the received signal is within half the distance (or some other pre specified distance) to the decision threshold for deciding the value of the received signal for the particular modulation type being used. Alternatively, the phase error word is the phase error between the received signal and the SATO (a well known equalizer adaptation algorithm) point if the received signal is outside half the distance of the decision threshold. Other outputs from the look up table include the Phase/Frequency (P/F) region bit, the Robust (R) region bit, and the carrier lock region (forbidden zone) bit. These outputs indicate, respectively, whether the received signal is within the P/F region for a particular constellation point, within the robust region for a particular constellation point or within the "forbidden zone" for the constellation overall, which is outside the allowed boundaries of the constellation for the particular modulation type. For example, in the case of a QAM-type modulation scheme having a square constellation shape, the carrier lock region indicates whether the received signal is in the area beyond the square constellation, i.e., whether the constellation is spinning, as discussed below. These outputs are used in conventional adaptation algorithms described in "New Phase & Frequency Detectors for Carrier Recovery in PSK & QAM Systems", H. Sari & S. Morida, IEEE Transactions on Communications, Vol. 36, No. 9, September 1988; "A New Class of Frequency Detectors for Carrier Recovery in QAM Systems", H. Sari, L. Desperben, S. Morita, ICC Proceedings of the International Communications Conference 1986; "Robust Control of Decision Directed Loops", M. H. Meyers, ICC Proceedings of the International Communications Conference 1989; the contents of which are incorporated by reference herein. These outputs are passed back into the second half of the carrier error FPGA 70.

The carrier lock region is a one bit data signal that indicates whether or not the received signal is inside or outside a square pattern. In the case of QAM-type modulation, when the carrier is not properly locked, the square constellation is spinning and results in a round shape.

For round (or PSK) modulations, angle sector like patterns will be used instead. The carrier error FPGA 70 accumulates this carrier lock region bit for a number of received signals to derive a carrier lock strength word. The carrier lock strength word is then compared against a predetermined threshold (internal to the carrier error FPGA 70) which is set by the DSP 72 to indicate an initial or fast carrier lock status. This fast carrier lock status bit is used by the symbol timing recovery function (not shown). The DSP 72 can also average the lock strength word and compare it against a different threshold to produce a more reliable carrier lock status indication.

Figure 7:
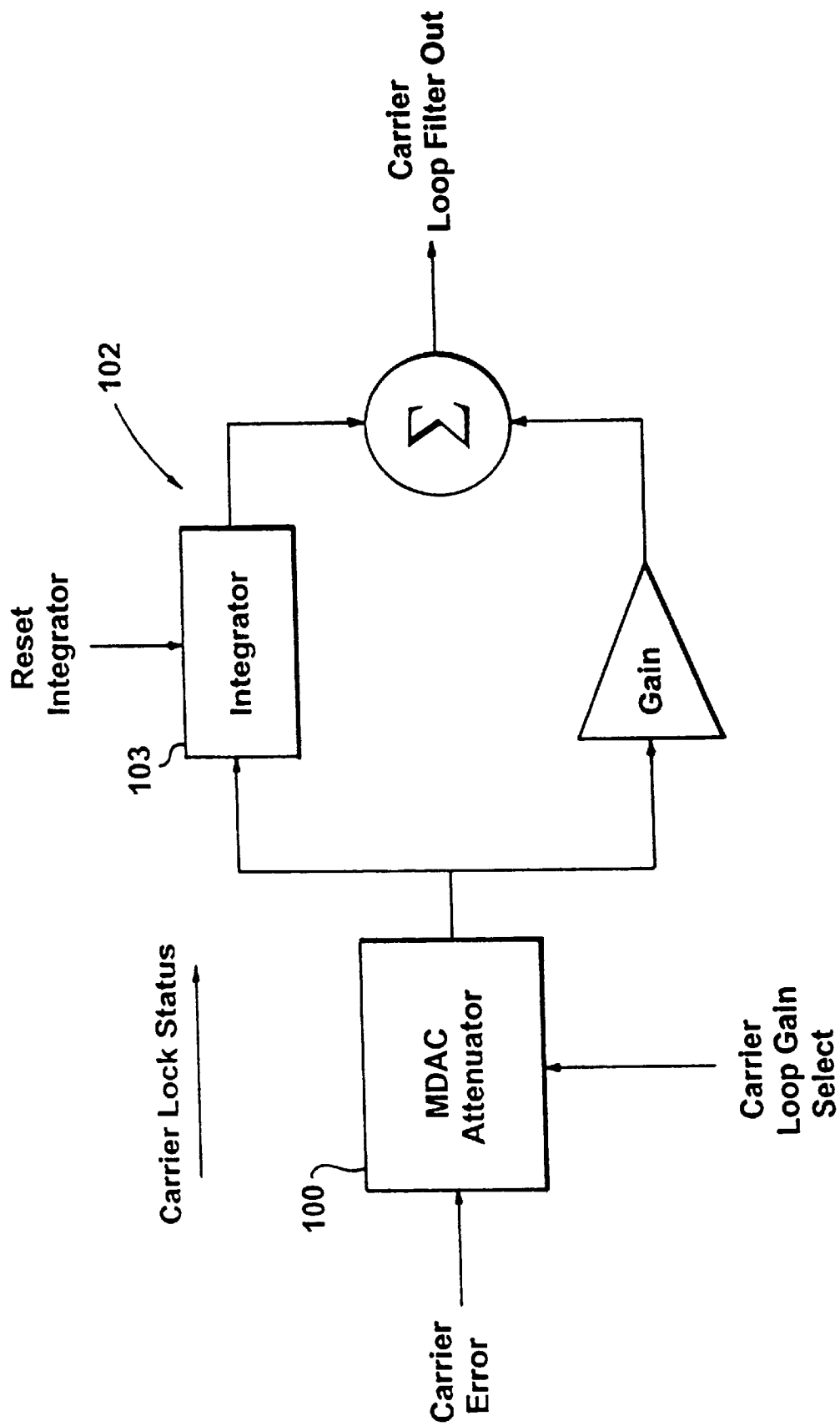
FIG. 7 is a block diagram of the carrier loop filter structure.

The DSP 72 will enable the carrier lock status signal and turn ON the carrier lock LED 76 only if the following conditions are met: (a) the signal is present, (b) the loop is not in frequency search mode, and (c) the lock strength word exceeds the predetermined threshold. This carrier lock status is also passed to the analog section of the circuit (FIG. 7). The analog carrier loop filter 80 operates with nominal gain when the loop is in a proper lock condition. When the loop is not properly locked, the loop filter gain is increased, as discussed below The DSP 72 makes the determination as to whether or not a proper lock condition has been achieved.

The processing which is performed by the carrier error FPGA 70 is performed according to either the Phase/Frequency (P/F) algorithm, the Robust algorithm, or the Decision Directed (DD) algorithm, as described more fully in the Sari and Meyers references discussed above. The particular algorithm is selected based on where the received data signal lies with respect to the optimal data position. The particular algorithm selected by DSP 72 is indicated by the Alg Sel control signal. The criteria for selecting a particular algorithm will be discussed in detail below.

Figure 9:
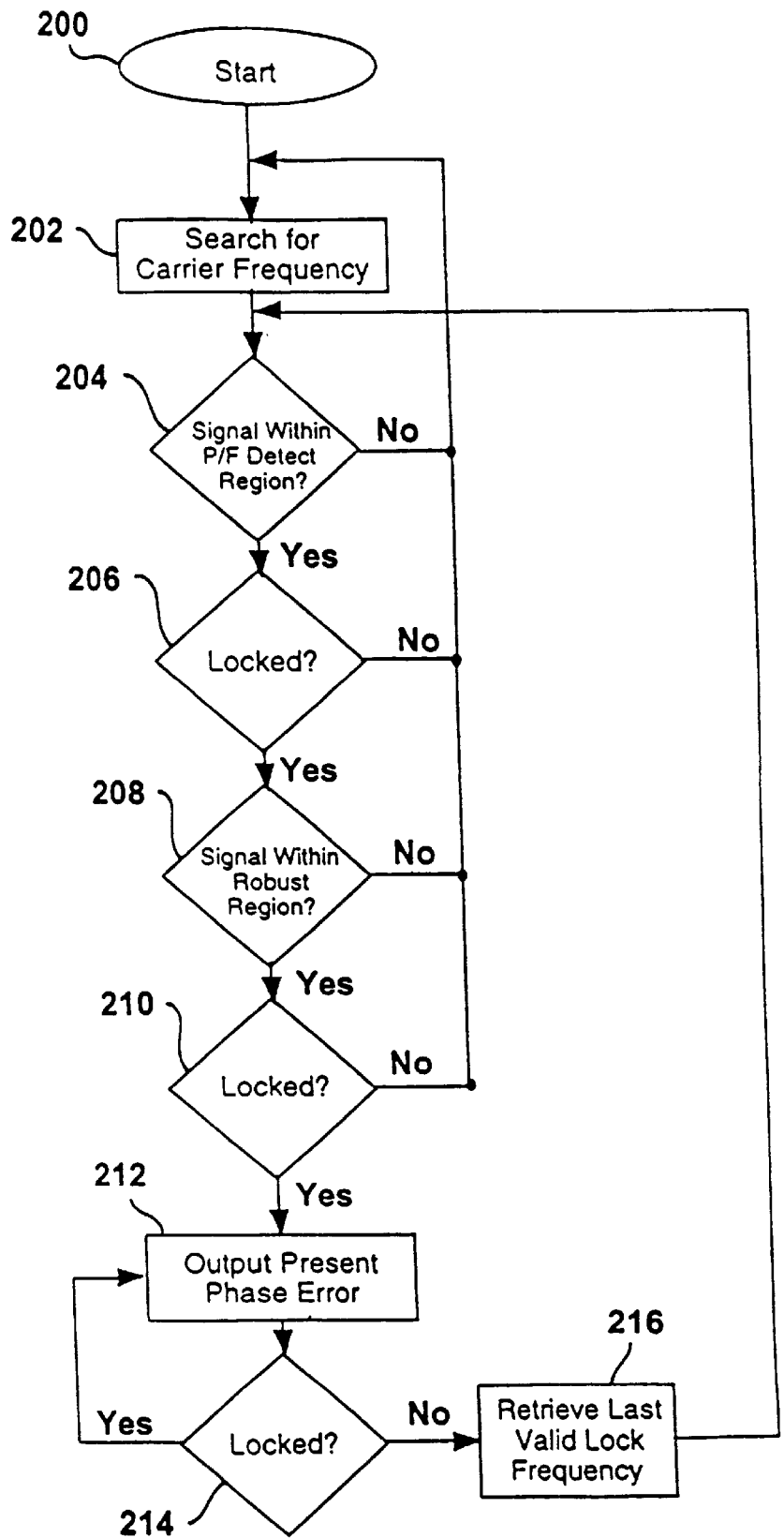
FIG. 9 is a flowchart illustrating the carrier recovery algorithm of the present invention.

Referring now to FIG. 9, therein is shown a flowchart showing the use of the carrier recovery algorithms in DSP 72 according to the present invention. The process illustrated is essentially a "coarse" to "fine" approach. First, the process begins at step 200 and continues to step 202 where VCO 88 (FIG. 6) is stepped in frequency as part of the search for the carrier frequency. Next, at step 204 it is determined whether the received signal is within the P/F region. If the received signal is within the P/F region, DSP 72 causes carrier error FPGA 70 to output the previous phase error (from the previous received signal) as the Carrier Error Word. Next, at step 206, the Accum Lock Region signal is checked to see if it exceeds a predetermined threshold indicating proper carrier frequency lock. If the carrier frequency is not properly locked, the system loops back to step 202 where VCO 88 is stepped in frequency and the process repeated. If at step 206 it is determined that the carrier lock frequency has been properly determined, the system then proceeds to step 208 where it is determined whether the received signal is within the robust region. If the received signal is within the robust region, then no error is output on the Carrier Error Word signal. Alternatively, if the received signal is outside the robust region, then the phase error for the current received signal is output as the Carrier Error Word signal. Then, at step 210, the Accum Lock Region signal is checked to see if it exceeds a second predetermined threshold higher than the first threshold. If the Accum Lock Region signal does not exceed this second threshold, the system loops back to step 202 where VCO 88 is once again stepped in frequency. Alternatively, the system then proceeds to step 212 and outputs the present phase error as the Carrier Error Word. The system then continues to step 214 where it checks to see if the Accum Lock Region signal exceeds a third, even higher threshold. If so, the system is properly locked and loops back to step 212, i.e., steady state lock. Alternatively, if the third threshold is not exceeded, then the system proceeds to step 216 and retrieves the last valid lock frequency and loops back to step 204 to repeat the above process in order to obtain the proper lock frequency.

The Carrier Error Word output from the carrier error FPGA 70 is first passed through D/A converter 82 and then passed to the carrier loop filter 80. The structure of the loop filter 80 is shown in detail in FIG. 7. Referring now to FIG. 7, the carrier error is attenuated by a multiplying D/A (MDAC) converter 100. The attenuation of MDAC 100 is controlled by the DSP 72 by way of the carrier loop gain sel signal. The optimum carrier loop gain during tracking is a function of the symbol rate, modulation, and input bypassing. A table of optimum carrier loop gain is empirically determined for each set of operating conditions. When the carrier is not in lock, the gain should be increased to widen the carrier loop bandwidth. After passing through MDAC 100, the carrier error signal is filtered by a proportional plus integral loop filter 102. The loop filter together with the VCO 88 results in the carrier loop being a second order control loop. When the loop filter integrator 103 is reset, then the carrier loop effectively becomes only a first order loop.

The output from the loop filter 80 is summed together with the output of the Local Oscillator (LO) frequency setting D/A converter 84 using summer 86. The purpose of D/A converter 84 is to both set the nominal operating frequency of VCO 88 during initial setup and to sweep the operating frequency of VCO 88 during a frequency search. The frequency setting and sweeping performed by D/A converter 84 is under the control of DSP 72 (with the help of a look up table). The look up table used by the DSP 72 to implement this function contains the frequency to voltage transfer function of the VCO as a function of the D/A setting and the output frequency when the loop integrator is reset. The contents of this look up table are generally determined empirically.

The output of summer 86 is provided as an input to VCO 88. In one preferred embodiment of the present invention, the LO frequency is chosen to be 70 MHz. However, by changing the parameters of VCO 88, the LO frequency may be set at 140 MHz or 160 MHz with minimum additional change. The LO frequency generated by VCO 88 is used by the mixer 62 to convert the intermediate frequency (IF) signal down to baseband (BB).

Figure 8:
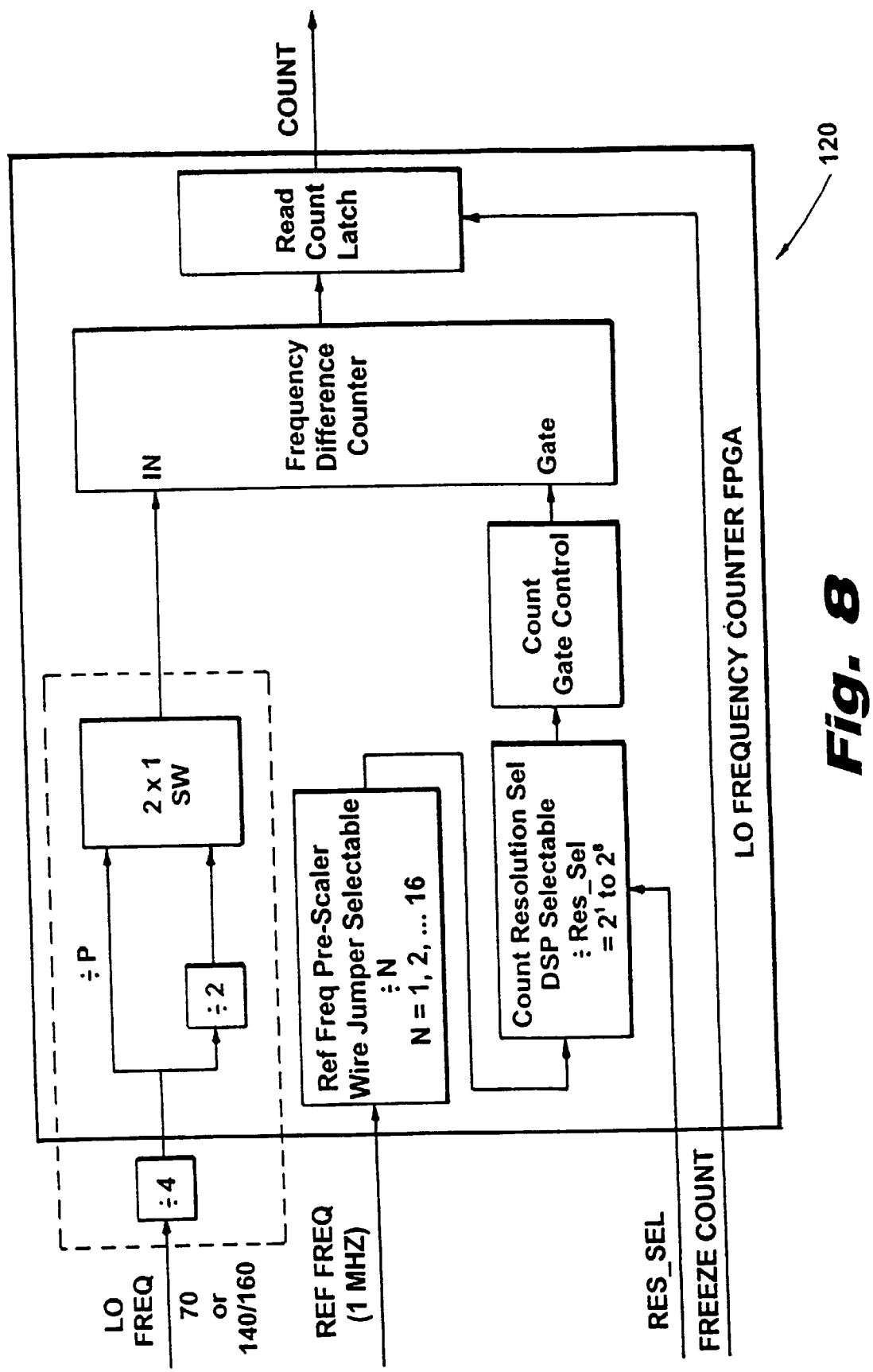
FIG. 8 is a block diagram of the LO frequency counter.

A LO frequency counter 120 is used to facilitate the carrier acquisition and re-acquisition process. A block diagram of this counter is shown in FIG. 8. The counter 120 may be implemented using a conventional frequency difference counter, well known to those of ordinary skill in the art, which counts the frequency difference between a reference oscillator frequency (REF FREQ) and the LO frequency (LO FREQ)generated by the VCO 88. A prescalar value (RES SEL) is used to select the frequency resolution of the counting as well as the measurement time. It should be noted that the frequency resolution and measurement time are inversely proportional, as shown in Table 2 below. In the example shown in FIG. 8, a 16 bit counter is implemented, which is forced to be zero in the event of an overflow. The LO frequency may be calculated by the DSP using the following formula:

$$\text{LO freq} = 3D((\text{count}+D)*P*\text{Ref})/(N*\text{res\_sel})$$

where count=the output of the frequency difference counter; D=3 if LO FREQ is 70 MHz, or 2 if LO FREQ is 140 or 160 MHz; P=4 if LO FREQ is 70 MHz, or 8 if LO FREQ is 140 or 160 MHz; Ref=actual reference frequency or REF FREQ (e.g., 1 MHz); N=reference frequency divide value which ranges from 1 to 16; and res_sel=resolution select (see Table 2), which is a prescalar value from 2^1 to 2^8

The frequency reference (REF FREQ) is pre-scaled to provide an acceptable tradeoff between count time and count resolution. The DSP can choose to read the LO frequency using a faster update during the frequency search and then switch to a higher resolution after the carrier is locked. An example of the resolution and count time for 70 MHz is shown below in Table 2.

TABLE 2

Example of Resolution and Count Time for 70 MHz Carrier

| Pre-Scalar | Measurement Time (micro sec) | Resolution (Hz) |
|---|---|---|
| 2 | 28.00 | 142,857 |
| 4 | 56.00 | 71,429 |
| 8 | 112.00 | 35,714 |
| 16 | 224.00 | 17,857 |
| 32 | 448.00 | 8,929 |
| 64 | 896.00 | 4,464 |
| 128 | 1792.00 | 2,232 |
| 256 | 3584.00 | 1,116 |

In the preferred embodiment described herein, the carrier loop is specified to acquire the carrier over a +/−200 KHz range. Table 3 below shows the condition of the LO frequency count, carrier lock status and the corresponding DSP course of action. When the LO Freq count is 0, this indicates that the counter 120 has overflowed and the frequency resolution should be reduced. When the LO frequency count is in the range of 70 MHz+/−200 KHz, then the LO frequency count is said to be within range. If the LO freq. is within range and the carrier lock status bit is set, this indicates that the carrier is locked and the count resolution should be set to high in order to improve the resolution of the carrier frequency. If the LO freq is within range and the carrier lock status bit is not set, this indicates that the carrier is not locked and that the frequency counter resolution should be decreased in order to decrease measurement time and thereby reach lock faster.

Next, if the LO frequency is outside of this range and yet the carrier is in lock, then it is possible that the carrier loop has false locked. If the LO frequency count is outside the +/−200 KHz range, and the loop is not in lock, then the VCO integrator is assumed to have saturated, i.e., it as at either the positive or negative supply voltage rail. When this condition occurs, the DSP 72 needs to issue a reset integrator command so that the integrator can start again.

TABLE 3

DSP Response Based on LO Frequency Count

| LO Freq Count | Carrier Lock LED | DSP Action |
|---|---|---|
| 0 | don't care | LO freq counter overflow, reduce resolution |
| within range | on | Carrier locked, set count resolution to high |
| within range | off | Acquiring carrier, set count resolution to low |
| outside range | on | Report possible false lock |

TABLE 3-continued

DSP Response Based on LO Frequency Count

| LO Freq Count | Carrier Lock LED | DSP Action |
|---|---|---|
| outside range | off | VCO saturated, reset loop integrator momentarily |

While the invention has been particularly shown and described with reference to a preferred embodiment thereof, it will be understood by those skilled in the art that various changes in form and details may be made therein without departing from the spirit and scope of the invention.

What is claimed is:

1. A method for variably allocating upstream and downstream communication channels in a communication system frequency spectrum, comprising the following steps:
   characterizing the signal characteristics of at least a portion of said frequency spectrum;
   allocating a first portion of the frequency spectrum for the downstream communication channel;
   allocating a second portion of the frequency spectrum for the upstream communication channel; and
   re-characterizing the signal characteristics for conditional re-allocation in accordance with the changing characteristics of said frequency spectrum during message transmission.

2. The method of claim 1, wherein said characterizing step determines a usable portion of said communication frequency spectrum, said characterizing step comprising the following steps:
   identifying a usable portion of said communication system frequency spectrum, said identifying step comprising the following steps
   (a) estimating for a received signal at least one of signal to noise margin and bit error rate for a selected portion of said communication system frequency spectrum;
   (b) determining for said selected portion at least one of whether said signal to noise margin exceeds a predetermined signal to noise margin threshold and whether said bit error rate is less than a predetermined bit error rate threshold;
   (c) repeating step (b) at least one additional time if said signal to noise margin does not exceed said predetermined signal to noise margin threshold or if said bit error rate is less than said predetermined bit error rate threshold;
   (d) shifting said selected portion of said communication system frequency spectrum to a different frequency portion and repeating steps (a), (b) and (c) until the determining step indicates at least one of said signal to noise margin being less than said predetermined signal to noise margin threshold and said bit error rate exceeding said predetermined bit error rate threshold for a predetermined number of iterations;
   said usable portion of said communication system frequency spectrum corresponding to the selected portions of said communication system frequency spectrum for which said determining step indicates that at least one of said signal to noise ratio margin is greater than said predetermined signal to noise ratio threshold or said bit error rate is less than said predetermined bit error rate threshold.

3. The method of claim 2, wherein said shifting step shifts said selected portion to a higher frequency portion.

4. The method of claim 2, wherein said shifting step shifts said selected portion to include a higher frequency portion and a lower frequency portion.

5. The method of claim 2, wherein the steps of allocating the first and second portions are performed dynamically to allocate variable amounts of the usable portion of said communication system frequency spectrum to said upstream and downstream communication channels to match preselected bandwidth requirements.

6. The method of claim 2, wherein said identifying step is periodically repeated in order to characterize the frequency spectrum to reallocate the upstream and downstream communication channels based on changing noise or interference conditions.

7. The method of claim 2, wherein at least one of said upstream and downstream communication channels is variable in size.

8. The method of claim 2, wherein said upstream and downstream communication channels are positioned at relative higher or lower frequencies in accordance with predetermined data transmission quality levels associated with said upstream and downstream communication channels.

9. The method of claim 2, wherein said upstream and downstream communication channels are positioned at relative higher or lower frequencies in accordance with the provisioning of communication services in a particular data transmission medium.

10. The method of claim 2, wherein said upstream and downstream communication channels are positioned at fixed or variable frequencies in accordance with the provisioning of communication services in a particular data transmission medium.

11. The method of claim 2, wherein said estimating step comprises the step of calculating a cluster variance for a received signal constellation.

12. The method of claim 11, further comprising the step of calculating a carrier to noise ratio based on said cluster variance.

13. The method of claim 12, wherein said carrier to noise ratio C/N is calculated from said cluster variance in accordance with the following relationship:

$$\frac{C}{N} = \frac{\mathcal{A}_{RMS}^2}{2s^2}, \quad \text{where}$$

$$\frac{\mathcal{A}_{RMS}^2}{2s^2} = \frac{1}{M^2} \sum_{i=1}^{M} \sum_{j=1}^{M} (\hat{x}_{ij}^2 + \hat{y}_{ij}^2)$$

is the mean square signal power of the entire constellation, expressed in terms of the estimated cluster centers and the variance $s^2$ is the noise power of the entire constellation.

14. The method of claim 13, further comprising the steps of calculating a minimum acceptable carrier to noise ratio C/N MIN in accordance with the following relationship:

$$C/N \text{ MIN} = L \ d^2/2(kd)^2 = L/2 \ k^2$$

where k is a cluster tightness parameter in the range 0.5<k<1.0, d is the noise margin for the particular cluster in the constellation, and L is a modulation dependent parameter; and
    comparing the calculated carrier to noise ratio C/N for each selected portion of the frequency spectrum with the minimum acceptable carrier to noise ratio C/N MIN to determine the accuracy of the calculated carrier to noise ratio C/N.

15. The method of claim 13, wherein the cluster variance s is calculated according to the following relationship:

$$s = \sqrt{\frac{1}{2N - M^2} \sum_{i=1}^{M} \sum_{j=1}^{M} (K_{ij} - 1)(s_{xx_{ij}}^2 + s_{yy_{ij}}^2)}.$$

16. The method of claim 1, wherein said upstream communication channel is positioned at a lower frequency with respect to said downstream communication channel.

17. The method of claim 16, wherein said downstream communication channel is positioned at a fixed frequency.

18. The method of claim 16, wherein said downstream communication channel is positioned at a next higher frequency with respect to said upstream communication channel.

19. The method of claim 1, wherein said downstream communication channel is positioned at a lower frequency with respect to said upstream communication channel.

20. The method of claim 19, wherein said upstream communication channel is positioned at a fixed frequency.

21. The method of claim 19, wherein said upstream communication channel is positioned at a next higher frequency with respect to said downstream communication channel.

22. The method of claim 2, further comprising the step of performing a carrier recovery procedure to locate a carrier frequency for properly demodulating at least one of said upstream and downstream communication channels, said carrier recovery procedure comprising the following steps:
    (e) determining an error region and a distance to decision threshold for each point in a signal constellation;
    (f) setting a carrier frequency;
    (g) for each received signal point, determining the phase error between the received signal point and an ideal signal point location;
    (h) for each received signal point, generating a carrier lock region bit indicating whether the received signal is within a predetermined region surrounding said corresponding ideal signal point location;
    (i) accumulating said carrier lock region bits for a plurality of points in said signal constellation to determine a constellation lock signal;
    (j) comparing said constellation lock signal with a predetermined threshold to indicate whether a proper carrier frequency for demodulation has been achieved so that said constellation is properly locked;
    (k) if said comparing step indicates that said proper carrier frequency has not been achieved, then said carrier frequency is incremented and the process is repeated beginning with step (g).

23. A system for variably allocating upstream and downstream communication channels in a communication system frequency spectrum, comprising:
    a signal characterization circuit which characterizes the signal characteristics of at least a portion of said frequency spectrum;
    a signal allocation circuit which allocates a first portion of the frequency spectrum for the downstream communication channel and a second portion of the frequency spectrum for the upstream communication channel; and
    re-characterizing the signal characteristics for conditional re-allocation in accordance with the changing characteristics of said frequency spectrum during message transmission.

24. The system of claim 23, further comprising a circuit for determining a usable portion of the frequency spectrum, comprising:

(a) a signal estimation circuit which estimates at a receiver location for a received signal at least one of signal to noise margin and bit error rate for a selected portion of said communication system frequency spectrum;

(b) an error estimation circuit which determines for said selected portion at least one of whether said signal to noise margin exceeds a predetermined signal to noise margin threshold and whether said bit error rate is less than a predetermined bit error rate threshold;

(c) a signal shifting circuit which shifts said selected portion of said communication system frequency spectrum to a next contiguous frequency portion and operates the signal estimation circuit and error estimation circuit until the error estimation circuit indicates at least one of said signal to noise margin being less than said predetermined signal to noise margin threshold and said bit error rate exceeding said predetermined bit error rate threshold for a predetermined number of iterations;

said usable portion of said communication system frequency spectrum corresponding to the selected portions of said communication system frequency spectrum for which said error estimation circuit indicates that at least one of said signal to noise ratio margin is greater than said predetermined signal to noise ratio threshold or said bit error rate is less than said predetermined bit error rate threshold.

25. The system of claim 24, wherein the signal estimation circuit and error estimation circuit are operated dynamically to allocate variable portion of the usable portion of said communication system frequency spectrum to said upstream and downstream communication channels to match preselected bandwidth requirements.

26. The system of claim 24, wherein said signal estimation circuit and error estimation circuit are operated periodically in order to characterize the frequency spectrum to reallocate the upstream and downstream communication channels based on changing noise or interference conditions.

27. The system of claim 24, wherein at least one of said upstream and downstream communication channels is variable in size.

28. The system of claim 24, wherein said upstream and downstream communication channels are positioned at relative higher or lower frequencies in accordance with predetermined data transmission quality levels associated with said upstream and downstream communication channels.

29. The system of claim 24, wherein said upstream and downstream communication channels are positioned at relative higher or lower frequencies in accordance with the provisioning of communication services in a particular data transmission medium.

30. The system of claim 24, wherein said error estimation circuit calculates a cluster variance for a received signal constellation.

31. The system of claim 30, wherein said error estimation circuit calculates a carrier to noise ratio based on said cluster variance.

32. The system of claim 31, wherein said carrier to noise ratio C/N is calculated from said cluster variance in accordance with the following relationship:

$$\frac{C}{N} = \frac{\mathcal{A}_{RMS}^2}{2s^2},$$

-continued where $$\frac{\mathcal{A}_{RMS}^2}{2} = \frac{1}{M^2} \sum_{i=1}^{M} \sum_{j=1}^{M} (\hat{x}_{ij}^2 + \hat{y}_{ij}^2)$$

is the mean square signal power of the entire constellation, expressed in terms of the estimated cluster centers and the variance $s^2$ is the noise power of the entire constellation.

33. The system of claim 32, wherein said error estimation circuit calculates a minimum acceptable carrier to noise ratio C/N MIN in accordance with the following relationship:

$$C/N \text{ MIN} = L \ d^2/2(kd)^2 = L/2 \ k^2$$

where k is a cluster tightness parameter in the range 0.5<k<1.0, d is the noise margin for the particular cluster in the constellation, and L is a modulation dependent parameter; and said error estimation circuit compares the calculated carrier to noise ratio C/N for each selected portion of the frequency spectrum with the minimum acceptable carrier to noise ratio C/N MIN to determine the accuracy of the calculated carrier to noise ration C/N.

34. The system of claim 32, wherein the cluster variance s is calculated according to the following relationship:

$$s = \sqrt{\frac{1}{2N - M^2} \sum_{i=1}^{M} \sum_{j=1}^{M} (K_{ij} - 1)(s_{xx_{ij}}^2 + s_{yy_{ij}}^2)}.$$

35. The system of claim 24, further comprising a carrier recovery circuit which locates a carrier frequency for properly demodulating at least one of said upstream and downstream communication channels, said carrier recovery circuit comprising:

(e) means for determining an error region and a distance to decision threshold for each point in a signal constellation;

(f) means for setting a carrier frequency;

(g) for each received signal point, means for determining the phase error between the received signal point and an ideal signal point location;

(h) for each received signal point, means for generating a carrier lock region bit indicating whether the received signal is within a predetermined region surrounding said corresponding ideal signal point location;

(i) means for accumulating said carrier lock region bits for a plurality of points in said signal constellation to determine a constellation lock signal;

(j) means for comparing said constellation lock signal with a predetermined threshold to indicate whether a proper carrier frequency for demodulation has been achieved so that said constellation is properly locked;

(k) if said comparing step indicates that said proper carrier frequency has not been achieved, then said carrier frequency is incremented and elements (g) through (j) are operated.

* * * * *